J. S. ROSS.
Steam-Sled.
No. 68,115.
Patented Aug. 27, 1867.
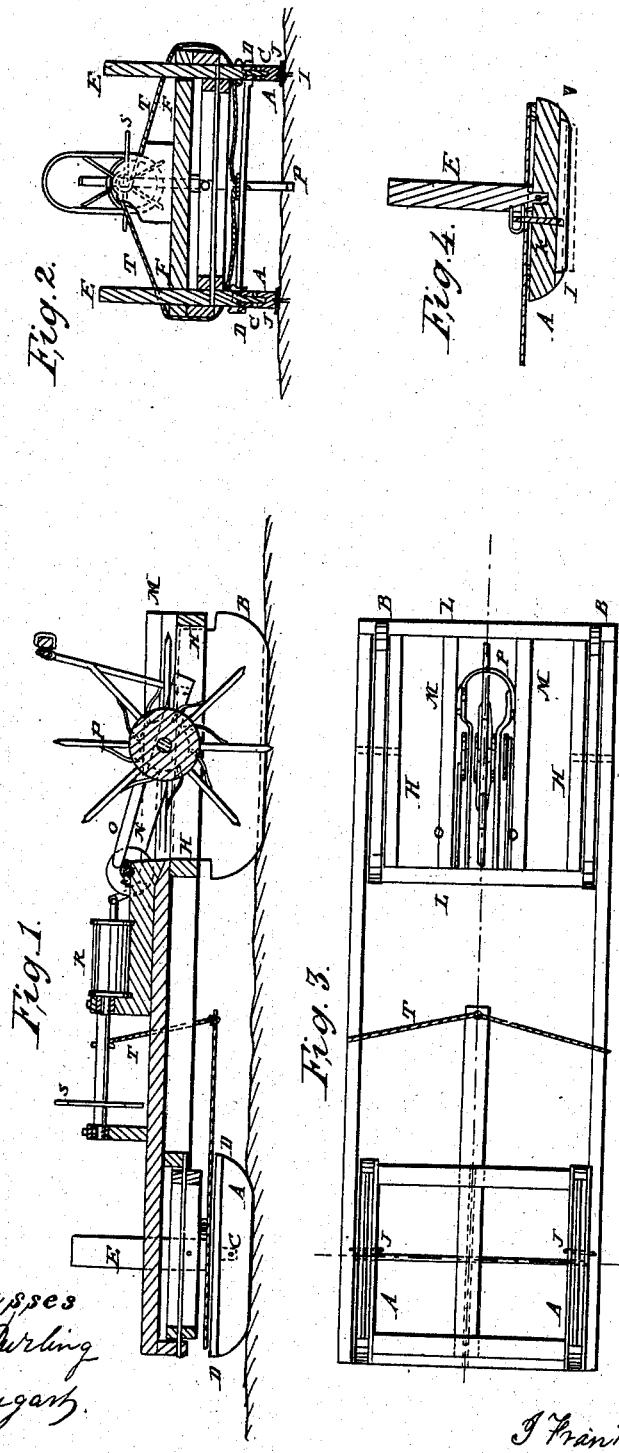

United States Patent Office.

JOHN S. ROSS, OF HAMILTON COUNTY, IOWA.

Letters Patent No. 68,115, dated August 27, 1867.

IMPROVEMENT IN STEAM-SLED.

*The Schedule referred to in these Letters Patent and making part of the same.*

TO ALL WHOM IT MAY CONCERN:

Be it known that I, JOHN S. ROSS, of the county of Hamilton, and State of Iowa, have invented an improved Steam-Sled; and I do hereby declare the following to be an exact description thereof, reference being had to the accompanying drawings, and to the letters of reference marked thereon, making a part of this specification, in which—

Figure 1 represents a longitudinal section.

Figure 2, a cross-section.

Figure 3, a top view, and

Figure 4 the front runner and post of the sled.

The nature of my invention consists in the arrangement and combination of the adjustable knives with the runners, as operated by the wheel.

It is made in the form of two sleds. The front sled has two runners, marked in diagram hereto attached, A A. The second sled has two runners, marked in diagram B B. The runners A A are made of solid boards, of any desired thickness and size. In the middle of each of said runners a gain is cut from the top three-fourths of the way through the runner. The gain is the same width at the bottom that the runner is thick, and widens one inch in four towards the top. On each side of said runners, and running across the gain above described, is bolted a bar of iron in said gains, making a socket in said gains marked C C. On the top of the runners A A is bolted a plank, three times as wide as the thickness of the runner, through which a round hole is bored directly over and of the same size of the top of the gain, cut in the runner, marked D D. A post, E E, inserted in the bottom of the gain or socket C C, extends above the plank D D. To prevent the forward sled sliding sideways when turning there are attached to the runners A A adjustable knives, I I, of cast steel, held up from the ground or ice by pivot-bolts, J J, and so arranged that when the sled is turned to the right the knife I on the left runner will be crowded downward, by means of the bolt K pressing down upon the knife I. The hindmost sled is composed of runners B B, similar to the runners A A, to the top of which are bolted the bars H H, which attach the two sleds. From beams H H, over the front and rear ends of the hindmost sled, are the beams L L. Running parallel with the beams H H, and resting on the beams L L, are upright planks, M M, far enough apart for the wheel P, hereafter described, to work between them. Across the front end of the planks M M is a shaft, N, extending outside far enough to receive a crank on each end. To each of these cranks are attached the connecting-rods O O, which rods are attached at the rear ends to the shafts of the wheel P.

The wheel plays between the planks M M at the middle of the hind sled. The arms P are to be steel points, and shaped at the outer ends like the edge of an axe. The wheel raises or lowers without raising or lowering the sleds. The sled is propelled by attaching the power to the shaft N, revolving the wheel P, the arms of which strike into the ice or ground and give the forward movement. The front end of the box or car to be placed on the sled is made to turn up like a scow, so that in case the sled breaks through the ice the box or car will be raised off the runners and run on top of the ice, leaving the sleds under the ice.

This sled may be used upon the ice or on the ground. It may be stopped by reversing the engine R, or by brakes. The sled is guided by means of wheel S and ropes T, the same as used to govern boats.

What I claim as my invention, and desire to secure by Letters Patent, is—

The arrangement and combination of the adjustable knives I with the runners A, when operated by the wheel P, as herein described and for the purposes set forth.

In witness whereof I have hereunto subscribed my name this 8th day of December, 1866.

JOHN S. ROSS.

Witnesses:
HIRAM BENNETT,
N. B. HYATT.